Sept. 13, 1966 H. G. HOEHMANN 3,272,456

PNEUMATIC CARRIER SELECTOR VALVE, DECELERATOR AND HOLD MECHANISM

Filed Aug. 10, 1964 2 Sheets-Sheet 1

INVENTOR.
HENRY G. HOEHMANN

BY John L. Jackson

ATTORNEY

United States Patent Office 3,272,456

Patented Sept. 13, 1966

3,272,456

PNEUMATIC CARRIER SELECTOR VALVE, DECELERATOR AND HOLD MECHANISM

Henry G. Hoehmann, Los Gatos, Calif., assignor to International Business Machines Corporation, New York, N.Y., a corporation of New York Filed Aug. 10, 1964, Ser. No. 388,377
5 Claims. (Cl. 243—29)

This invention relates to pneumatic tube-type carrier mechanisms in general and more particularly to a valving mechanism for use therein operable to selectively, pneumatically and mechanically connect a tube array.

While the art of pneumatic tube conveying is generally old and well developed, particularly with respect to pneumatic conveying systems characterized by the well known types utilized in department stores, one relatively new application of pneumatic tube conveying has presented a series of new problems not solvable with present day pneumatic tube conveying systems. This new application is in the field of image storage and retrieval wherein images of documents or other data are stored in micro-image size on film chips, a number of which in turn are stored in cells which constitute the basic transported member. In the usual system a number of these cells are stored in trays and some means is provided for selecting and pneumatically moving a cell into a file input/output tube. Known pneumatic tube conveying technologies can be utilized with an image storage and retrieval system wherein only one file is connected to a single input/output station. However, where a plurality of files are connected to a single input/output station or where a plurality of input/output stations are connected to a single file, problems arise. For instance, considering a system wherein the input/output tubes of a number of files are in operable communication with a main conveyor tube leading to an input/output station, a desired systems operation would be to apply air flow to all of the files simultaneously to remove the selected cell which is desired from each of the files. Then, when the cells are to be returned to their respective files, the air flow would be reversed, thus driving the cells back to the files. Heretofore it has been the practice to only connect a single file of a plurality of files to the pneumatic system since the prior art systems have been incapable of handling a number of cells in the file input/output tubes and the main conveyor tube without cell collision. Obviously, the throughput of such a system is relatively limited.

As stated previously, the ideal system would allow simultaneous movement of cells in each of the file input/output tubes along with an orderly movement of the cells into the main conveyor tube. One obvious problem is that two cells cannot occupy the same place in the tube at the same time; therefore, likelihood of collision exists. An obvious solution is to block off the pneumatic input/output tube of all of the files but one. However, in a vertical file input/output tube this would cause the cells of the files having their tubes blocked to fall back into the file. Another solution would be to provide a partial blocking such that sufficient pneumatic pressure would exist on the non-selected cells to bring them to the entrance to the common tube. A simple gate partially across the delivery tube is not appropriate, however, because the cells would slam into the blocking mechanism with probable resultant damage.

It is an object of the present invention to provide a novel pneumatic tube member transport system.

Another object of the present invention is to provide a novel pneumatic member handling system wherein movement of members in a plurality of input/output tubes can take place simultaneously.

Another object of the present invention is to provide a novel switching mechanism for selectively, mechanically and pneumatically coupling either of two input/output tubes to a main channel.

Another object of the present invention is to provide a novel switch buffer mechanism operable to connect input/output channels with a main channel which not only selectively, pneumatically and mechanically connects the input/output channel to the main channel, but, additionally, decelerates and buffers its associated cell until clearance into the main channel can be effected.

Other and further objects and advantages of the invention will be apparent from the following more particular description of the preferred embodiment of the invention as illustrated in the accompanying drawings in which.

Briefly, there is provided a buffer selector switch operable to selectively, mechanically and pneumatically connect one of two file input/output tubes to a main channel by movement of a ganged double-vaned valve to one of two positions.

Figure 1:
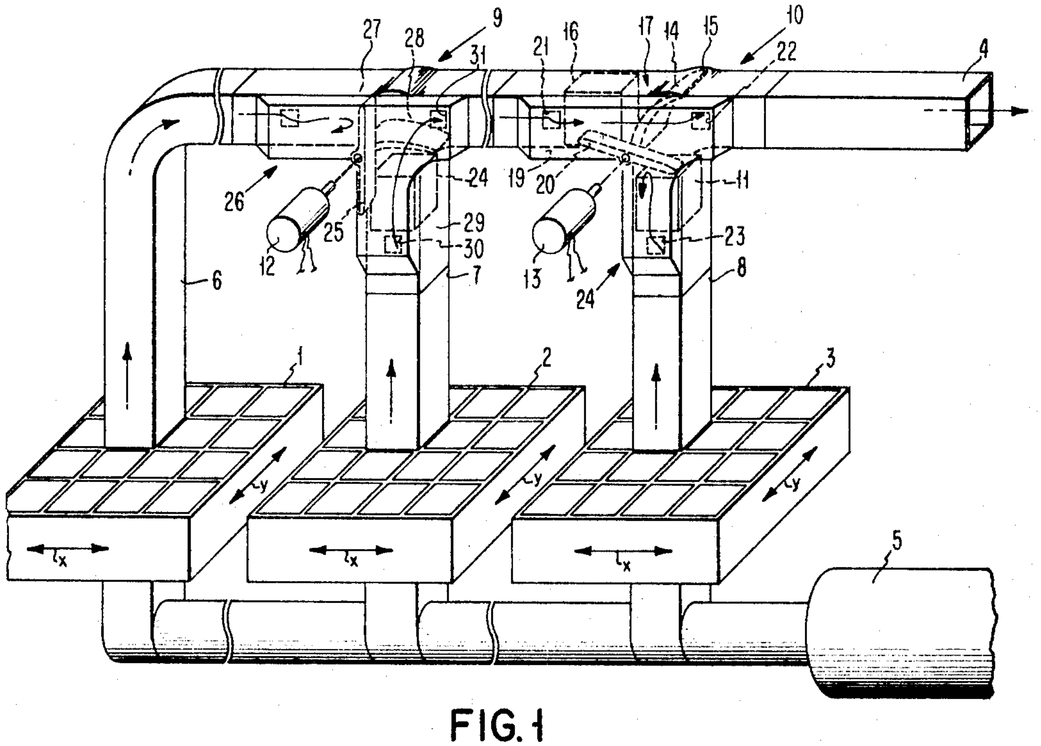
FIG. 1 is a representation of a typical systems application wherein two buffer selector switches are utilized to selectively, mechanically and pneumatically connect three files to a main transport tube.

Refer first to FIG. 1 wherein is shown for purposes of systems illustration three files 1, 2 and 3 which are to be selectively and pneumatically coupled to a main conveyor tube 4 without interruption of air flow through the system. Shown connected to each of the files 1, 2 and 3 is a reversible pneumatic supply 5, the particular configuration of which is not important for the purposes of the subject invention. Likewise, the particular configuration of the files 1, 2 and 3 is not important with respect to the subject invention. While in FIG. 1 the files 1, 2 and 3 are shown as constituting a drawer movable along both the X–Y axis to position a selected cell in operable association with the three subchannels or file input/out tubes 6, 7 and 8, it will, of course, be understood that any type of file or container having articles which are to be pneumatically moved can be utilized.

As shown in FIG. 1, connected to the file input/output tubes 7 and 8 of files 2 and 3, respectively, are two-position valves or buffer selector switches designated generally as 9 and 10, respectively. Each buffer selector switch contains a rotatable double-vaned blade operable under control of motive means 12 and 13 to selectively, mechanically and pneumatically connect a file input/output tube to the main conveyor tube without interruption of systems air flow, as will hereinafter be described in greater detail.

In the following description, reference will be had to all of the figures to enable a full understanding of the novel aspects of the buffer selector switch of the subject invention. In FIG. 1 the buffer selector switch 10 is shown in a condition operable to pass a cell 11 contained in its file input/output tube 8 into the main conveyor tube 4. Thus, the rotatable double-vaned blade is positioned such that the selector vane 14 is seated in the selector vane seat 15 thereby blocking the cell 16 which is positioned in the main switch channel 17. As shown more clearly in FIG. 2, a wall 18 separates the main switch channel from a pneumatic bypass channel 19. With the selector vane 14 in the position as shown in FIG. 1, the cell 16 is blocked from movement through the main switch channel, but air may continue to flow through the system around the selector vane 14 since the flow vane 20 is in a position such that, as shown in FIG. 2, air may flow into the left arm pneumatic port 21 through the bypass 19, over the flow vane 20 and out of the right arm pneumatic port 22 into the main channel or transport tube 4.

Figure 3:
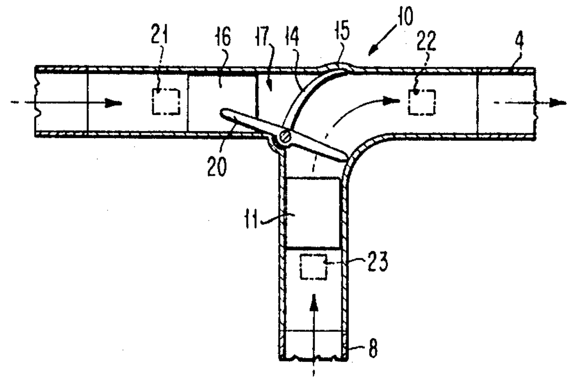
FIG. 3 is a side view of the right hand buffer selector switch of FIG. 1.
Figure 4:
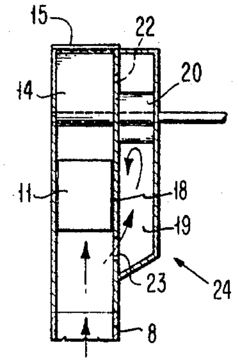
FIG. 4 is an end view of the right hand buffer selector switch of FIG. 1.
Figure 2:
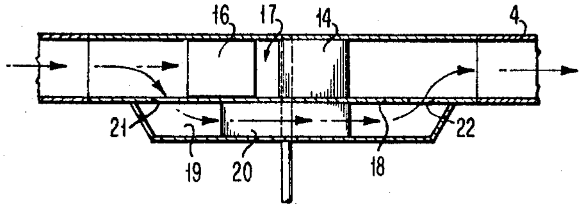
FIG. 2 is a top view of the right hand buffer selector switch of FIG. 1.
Figure 6:
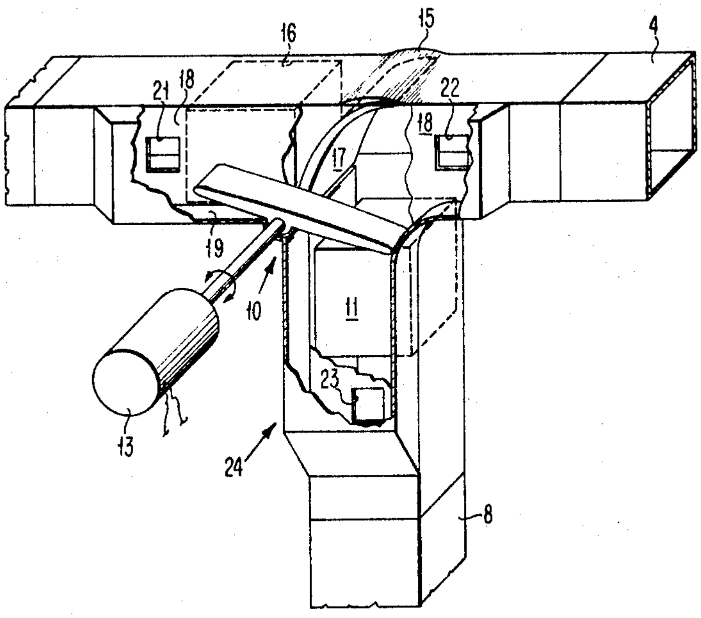
FIG. 6 is a detailed, enlarged drawing of the right hand buffer selector switch of FIG. 1.

At the same time, as illustrated in more detail in FIGS. 2, 3 and 6, the cell 11 is being propelled pneumatically up through the file input/output tube 8. The cell 11 has passed the leg pneumatic port 23, but, due to the position of the flow vane 20 which is blocking the pneumatic bypass leg generally designated at 24, air cannot escape and the cell 11 continues to be driven up through the file input/output tube 8 until it contacts the selector vane 14 which is curved such that the cell 11 is guided into the main transport tube 4. After the cell 11 passes the right arm pneumatic port 22, the air from both the right arm pneumatic port 22 and the air from the input/output tube 8 will propel the cell down the main transport tube 4.

Figure 5:
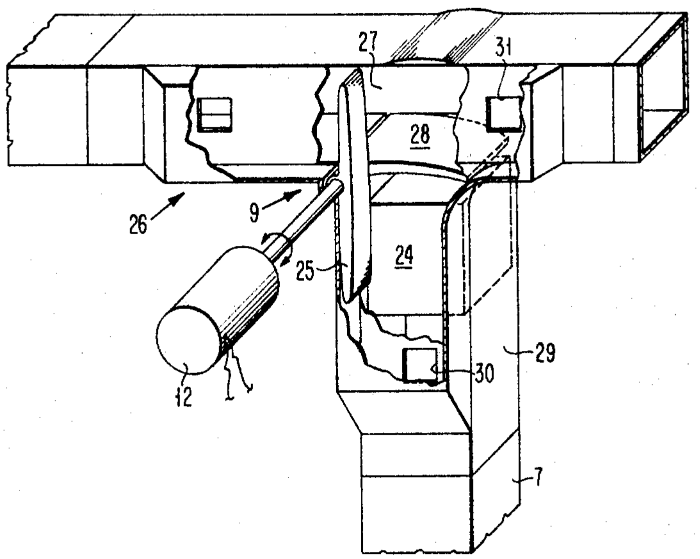
FIG. 5 is a detailed, enlarged drawing of the left hand buffer selector switch of FIG. 1.

In FIG. 1 the buffer selector switch 9 is shown in a position such that the cell 16 has been passed from the file 1 through its input/output tube 6 into the position shown in FIG. 1. Likewise, in this position the buffer selector valve 9 acts as a buffer to hold the cell 24 which is in the file input/output tube 7 of file 2. As shown in FIG. 1 and in more detail in FIG. 5, the flow vane 25 is positioned such that the left arm pneumatic bypass 26 of the buffer selector switch 9 is blocked such that the air from the file input/output tube 6 must pass down the main switch channel 27. Likewise, the selector vane 28 is in a position such that the cell 16 can pass over it into the buffer selector switch 10. With respect to cell 24, the selector vane 28 has been rotated such that it blocks the leg cell channel or switch subchannel 29; however, air continues to flow from the file input/output tube 7 through the leg pneumatic port 30 past the selector vane 28 and out the right arm pneumatic port 31. The flow of air maintains the cell 24 in the buffer selector switch 9 such that it will not drop back down into the file 2.

In the above described manner there has been provided a novel buffer selector switch which, by means of a simple two-position movement, is operable to mechanically and pneumatically connect one of two file input/output tubes to a main conveyor tube for transport of a selected cell therethrough. Operation of the buffer selector switch not only can be accomplished without interruption of air flow through the system such that cells which are being transported can continue on their way to provide overlap of operations, but, additionally, due to the novel buffering reatures of the buffer selector switch, several cells can arrive in a buffer selector switch simultaneously without fear of collision. Likewise, due to the buffering feature of the buffer selector switch, no deceleration of the cells is necessary as they enter into the buffer station since a free piston effect is created. Moreover, the particular arrangement of the selector vane and bypass of the pneumatic system allows a cell in a vertical leg to enter into a buffer selector switch and be held thereby without any sort of mechanical locking system.

While the invention has been particularly shown and described with reference to a preferred embodiment thereof, it will be understood by those skilled in the art that various changes in the form and details may be made therein without departing from the spirit and scope of the invention.

What is claimed is:

1. A switching apparatus for use in an information handling system wherein a main channel is to be selectively, pneumatically and mechanically coupled to two subchannels, said switching apparatus comprising:

- a main switch channel adapted to be connected to said main channel,
- first and second switch subchannels adapted to be connected to said two subchannels,
- means for selectively, mechanically and pneumatically connecting a switch subchannel to said main switch channel while mechanically and pneumatically blocking the other switch subchannel from said main switch channel, and
- a pneumatic bypass to said main switch channel from said blocked switch subchannel.

2. A switching apparatus for use in an information handling system wherein a main channel is to be selectively, pneumatically and mechanically coupled to two subchannels, said switching apparatus comprising:

- a main switch channel adapted to be connected to said main channel,
- first and second switch subchannels adapted to be connected to said two subchannels,
- a first pneumatic bypass connecting said main switch channel to said first switch subchannel,
- a second pneumatic bypass connecting said main switch channel to said second switch subchannel, and
- a two-position valve in operable association with said main switch channel, said first and second switch subchannels, and said first and second pneumatic bypasses.

3. A switching apparatus for use in an information handling system wherein a main channel is to be selectively, pneumatically and mechanically coupled to two subchannels, said switching apparatus comprising:

- a main switch channel adapted to be connected to said main channel,
- first and second switch subchannels adapted to be connected to said two subchannels,
- a first pneumatic bypass connecting said main switch channel to said first switch subchannel,
- a second pneumatic bypass connecting said main switch channel to said second switch subchannel,
- a two-position valve in operable association with said main switch channel, said first and second switch subchannels, and said first and second pneumatic bypasses,
  - said valve being operable in a first position to mechanically and pneumatically block said first switch subchannel and to establish an air passage through said first bypass, and to establish a mechanical and pneumatic path through said second switch subchannel to said main switch channel,
  - said switch being operable in a second position to block said first pneumatic bypass and establish a mechanical and pneumatic path through said first switch subchannel to said main switch channel and to pneumatically and mechanically block said second switch subchannel and establish an air passage through said second pneumatic bypass, and
- means for selectively moving said two-position valve.

4. A switching apparatus for use in an information handling system wherein a main channel is to be selectively, pneumatically and mechanically coupled to two subchannels, said switching apparatus comprising:

- a main switch channel adapted to be connected to said main channel,
- first and second switch subchannels adapted to be connected to said two subchannels,
- a first pneumatic bypass connecting said main switch channel to said first switch subchannel,
- a second pneumatic bypass connecting said main switch channel to said second switch subchannel,
- a selector vane selectively operable to mechanically and pneumatically connect said first and second switch subchannels to said main switch channel, and
- a flow vane operable to selectively and pneumatically block said pneumatic bypasses.

5. A switching apparatus for use in an information handling system wherein a main channel is to be selectively, pneumatically and mechanically coupled to two subchannels, said switching apparatus comprising:

a first switch channel adapted to be connected to said main channel, first and second switch subchannels adapted to be connected to said two subchannels, a first pneumatic bypass connecting said main switch channel to said first switch subchannel, a second pneumatic bypass connecting said main switch channel to said second switch subchannel, and a double-vaned, ganged valve including a selector vane and a flow vane, said selector vane being in operable mechanical and pneumatic association with said first and second switch subchannels and said main switch channel, said flow vane being in operable pneumatic association with said first and second pneumatic bypasses.

References Cited by the Examiner

UNITED STATES PATENTS 1,883,844 10/1932 Needham ------------ 243—31

SAMUEL F. COLEMAN, *Primary Examiner.*